United States Patent
Gao et al.

(10) Patent No.: US 12,423,186 B2
(45) Date of Patent: Sep. 23, 2025

(54) FAULT RECOVERY METHOD AND SYSTEM FOR BASEBOARD MANAGEMENT CONTROLLER FIRMWARE, AND DEVICE AND MEDIUM

(71) Applicant: SUZHOU METABRAIN INTELLIGENT TECHNOLOGY CO., LTD., Jiangsu (CN)

(72) Inventors: Ming Gao, Jiangsu (CN); Baoyang Liu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/878,020

(22) PCT Filed: Oct. 9, 2023

(86) PCT No.: PCT/CN2023/123623
§ 371 (c)(1),
(2) Date: Dec. 21, 2024

(87) PCT Pub. No.: WO2024/109360
PCT Pub. Date: May 30, 2024

(65) Prior Publication Data
US 2025/0165346 A1    May 22, 2025

(30) Foreign Application Priority Data
Nov. 21, 2022  (CN) .......................... 202211454173.1

(51) Int. Cl.
G06F 11/00   (2006.01)
G06F 11/14   (2006.01)

(52) U.S. Cl.
CPC ...... *G06F 11/1417* (2013.01); *G06F 2201/81* (2013.01)

(58) Field of Classification Search
CPC ............ G06F 11/1417; G06F 11/1402; G06F 11/142; G06F 9/4401
See application file for complete search history.

(56) References Cited

U.S. PATENT DOCUMENTS 11,907,073 B2 *   2/2024  Sun ..................... G06F 11/1441
2006/0020844 A1 * 1/2006  Gibbons ............... G06F 11/142
                                                    714/E11.134
(Continued)

FOREIGN PATENT DOCUMENTS

CN       103246583 A    8/2013
CN       111078452 A    4/2020
(Continued)

*Primary Examiner* — Jonathan D Gibson
(74) *Attorney, Agent, or Firm* — IPro, PLLC

(57) ABSTRACT

The present disclosure discloses a fault recovery method. The method includes: in response to a server being powered on or reset, starting baseboard management controller firmware from one or more flash memories storing the baseboard management controller firmware; in response to a failure of the starting the baseboard management controller firmware from the flash memories, starting a boot loader from a flash memory in which the boot loader is burned; in response to the boot loader being successfully started, obtaining backup baseboard management controller firmware from an external storage device through the boot loader, and burning the backup baseboard management controller firmware to any one of the flash memories; and in response to the burning being completed, resetting the server, and enabling the flash memory to start the backup baseboard management controller firmware from the flash memory in which the backup baseboard management controller firmware is burned.

18 Claims, 6 Drawing Sheets

(56) References Cited

U.S. PATENT DOCUMENTS

| | | | | |
|---|---|---|---|---|
| 2012/0110379 | A1* | 5/2012 | Shao | G06F 11/1417 |
| | | | | 714/15 |
| 2013/0173897 | A1* | 7/2013 | Wang | G06F 9/4401 |
| | | | | 713/1 |
| 2013/0205129 | A1 | 8/2013 | Peng | |
| 2013/0212430 | A1* | 8/2013 | Deng | G06F 11/0793 |
| | | | | 714/E11.133 |
| 2015/0186150 | A1 | 7/2015 | Chung et al. | |
| 2016/0004632 | A1* | 1/2016 | Zhao | G06F 9/4401 |
| | | | | 713/2 |
| 2017/0123923 | A1* | 5/2017 | Chang | G06F 11/2247 |
| 2018/0060231 | A1* | 3/2018 | Kelly | G06F 11/1441 |
| 2018/0088962 | A1* | 3/2018 | Balakrishnan | G06F 11/0757 |
| 2018/0107558 | A1* | 4/2018 | Rahardjo | G06F 9/4406 |
| 2018/0322012 | A1* | 11/2018 | Sharma | G06F 21/572 |
| 2019/0236277 | A1* | 8/2019 | Chang | G06F 21/64 |
| 2020/0193029 | A1* | 6/2020 | Liu | H04L 9/3234 |
| 2021/0200555 | A1* | 7/2021 | Wu | G06F 9/4416 |
| 2021/0303314 | A1* | 9/2021 | Chen | G06F 3/061 |
| 2023/0086829 | A1* | 3/2023 | Giri | G06F 9/4401 |
| | | | | 714/15 |
| 2023/0393944 | A1* | 12/2023 | Sun | G06F 11/142 |
| 2024/0211350 | A1* | 6/2024 | Bhatia | G06F 11/1417 |
| 2025/0028601 | A1* | 1/2025 | Bhatia | G06F 11/1417 |
| 2025/0165346 | A1* | 5/2025 | Gao | G06F 11/1417 |

FOREIGN PATENT DOCUMENTS

| | | |
|---|---|---|
| CN | 111475339 A | 7/2020 |
| CN | 112433769 A | 3/2021 |
| CN | 114860322 A | 8/2022 |
| CN | 115576747 A | 1/2023 |
| WO | 2022198973 A1 | 9/2022 |

* cited by examiner

FAULT RECOVERY METHOD AND SYSTEM FOR BASEBOARD MANAGEMENT CONTROLLER FIRMWARE, AND DEVICE AND MEDIUM

CROSS-REFERENCE TO RELATED APPLICATION

The present disclosure claims the priority of Chinese patent application filed on Nov. 21, 2022 before the CNIPA, China National Intellectual Property Administration with the application number of 202211454173.1, and the title of "FAULT RECOVERY METHOD AND SYSTEM FOR BASEBOARD MANAGEMENT CONTROLLER FIRMWARE, DEVICE AND MEDIUM", which is incorporated herein in its entirety by reference.

FIELD

The present disclosure relates to the field of server technologies, and more particularly to a fault recovery method and system for baseboard management controller firmware, a device and a non-transitory readable storage medium.

BACKGROUND

At present, with the blowout development of the Internet industry, a number of servers has also increased explosively, which poses new challenges to the operability, the maintainability and the recoverability of server products. A baseboard management controller (BMC) plays an important role in the server products. An emergence of the BMC greatly improves the operability and the maintainability of the server products, and makes an emergence of large-scale server rooms possible. In the related art, when a server is powered on or reset, BMC firmware will be started. The BMC firmware generally includes active BMC firmware and backup BMC firmware, which are stored in an active flash memory and a backup flash memory, respectively. If the active BMC firmware starts abnormally, the backup BMC firmware will be started; and if the backup BMC firmware also starts abnormally, the BMC firmware can only be recovered by disassembling the flash memories.

SUMMARY

In view of this, the present disclosure provides a fault recovery method and system for baseboard management controller firmware, a device and a non-transitory readable storage medium. When the BMC firmware is abnormal, the BMC firmware may be automatically recovered without disassembling the flash memories, and the operation is simple and convenient, thereby improving the maintenance efficiency and the product reliability of the server.

Based on the above object, an aspect of embodiments of the present disclosure provides a fault recovery method for baseboard management controller firmware. Following steps are performed based on a baseboard management controller:

in response to a server being powered on or reset, starting baseboard management controller firmware from one or more flash memories storing the baseboard management controller firmware;

in response to a failure of starting the baseboard management controller firmware from the one or more flash memories storing the baseboard management controller firmware, starting a boot loader from a flash memory in which the boot loader is burned;

in response to the boot loader being successfully started, obtaining backup baseboard management controller firmware from an external storage device through the boot loader, and burning the backup baseboard management controller firmware to any one of the one or more flash memories storing the baseboard management controller firmware; and in response to the burning being completed, resetting the server, and enabling the flash memory in which the backup baseboard management controller firmware is burned to start the backup baseboard management controller firmware from the flash memory in which the backup baseboard management controller firmware is burned.

In some embodiments, starting the baseboard management controller firmware from the one or more flash memories storing the baseboard management controller firmware includes:

starting a hardware timer, and starting the baseboard management controller firmware from the one or more flash memories storing the baseboard management controller firmware.

In some embodiments, in response to the failure of starting the baseboard management controller firmware from the one or more flash memories storing the baseboard management controller firmware includes:

in a process of starting the baseboard management controller firmware, in response to a timing of the hardware timer exceeding a threshold, determining that starting the baseboard management controller firmware from the one or more flash memories storing the baseboard management controller firmware failed.

In some embodiments, in response to the boot loader being successfully started, obtaining the backup baseboard management controller firmware from the external storage device through the boot loader includes:

in response to the boot loader being successfully started, turning off the hardware timer, and obtaining the backup baseboard management controller firmware from the external storage device through the boot loader.

In some embodiments, starting the baseboard management controller firmware from the one or more flash memories storing the baseboard management controller firmware includes:

selecting a flash memory from all flash memories storing the baseboard management controller firmware in a set order to start the baseboard management controller firmware; and in response to a failure of starting the baseboard management controller firmware from the selected flash memory, returning to the step of selecting the flash memory from all flash memories storing the baseboard management controller firmware in the set order to select a next flash memory from all flash memories storing the baseboard management controller firmware to start the baseboard management controller firmware.

In some embodiments, the method further includes:

in response to a success of starting the baseboard management controller firmware from the selected flash memory, waiting for a completion of starting the baseboard management controller.

In some embodiments, starting the baseboard management controller firmware from the one or more flash memories storing the baseboard management controller firmware includes:
- starting a hardware timer, and selecting a flash memory from all flash memories storing the baseboard management controller firmware in a set order to start the baseboard management controller firmware;
- in a process of starting the baseboard management controller firmware, in response to a timing of the hardware timer exceeding a threshold, determining that starting the baseboard management controller firmware from the selected flash memory failed; and
- resetting the hardware timer, and returning to the step of starting the hardware timer, and selecting the flash memory from all flash memories storing the baseboard management controller firmware in the set order to start the baseboard management controller firmware.

In some embodiments, the method further includes:
- in response to a success of starting the baseboard management controller firmware from the selected flash memory, turning off the hardware timer to wait for a completion of starting the baseboard management controller.

In some embodiments, before in response to the server being powered on or reset, starting the baseboard management controller firmware from the one or more flash memories storing the baseboard management controller firmware, the method further includes:
- connecting a decoder, the flash memory in which the boot loader is burned and the one or more flash memories storing the baseboard management controller firmware through a serial peripheral interface controller, and connecting the flash memory in which the boot loader is burned and the one or more flash memories storing the baseboard management controller firmware through the decoder to gate a corresponding flash memory when the server is powered on or reset.

In some embodiments, connecting the decoder, the flash memory in which the boot loader is burned and the one or more flash memories storing the baseboard management controller firmware through the serial peripheral interface controller includes: connecting signal transmission pins of the flash memory in which the boot loader is burned and signal transmission pins of the one or more flash memories storing the baseboard management controller firmware through signal transmission pins of the serial peripheral interface controller, and connecting input pins of the decoder through a chip select pin of the serial peripheral interface controller.

In some embodiments, connecting the flash memory in which the boot loader is burned and the one or more flash memories storing the baseboard management controller firmware through the decoder includes: connecting enable pins of the flash memory in which the boot loader is burned and enable pins of the one or more flash memories storing the baseboard management controller firmware through output pins of the decoder.

In some embodiments, starting the baseboard management controller firmware from the one or more flash memories storing the baseboard management controller firmware includes:
- starting a hardware timer, and selecting a flash memory from all flash memories storing the baseboard management controller firmware in a set order based on the serial peripheral interface controller to start the baseboard management controller firmware;
- in a process of starting the baseboard management controller firmware, in response to a timing of the hardware timer exceeding a threshold, determining that starting the baseboard management controller firmware from the selected flash memory failed;
- resetting the hardware timer, and returning to the step of starting the hardware timer, and selecting the flash memory from all flash memories storing the baseboard management controller firmware in the set order based on the serial peripheral interface controller to start the baseboard management controller firmware to select the flash memory from all flash memories storing the baseboard management controller firmware based on the serial peripheral interface controller to start the baseboard management controller firmware; and
- in response to a success of starting the baseboard management controller firmware from the selected flash memory, turning off the hardware timer to wait for a completion of starting the baseboard management controller.

In some embodiments, in response to the failure of starting the baseboard management controller firmware from the one or more flash memories storing the baseboard management controller firmware, starting the boot loader from the flash memory in which the boot loader is burned includes:
- in response to the failure of starting the baseboard management controller firmware from the one or more flash memories storing the baseboard management controller firmware, gating the flash memory in which the boot loader is burned based on the serial peripheral interface controller to start the boot loader from the flash memory in which the boot loader is burned.

In some embodiments, burning the backup baseboard management controller firmware to any one of the one or more flash memories storing the baseboard management controller firmware includes:
- gating any flash memory storing the baseboard management controller firmware from all flash memories storing the baseboard management controller firmware based on the serial peripheral interface controller to burn the backup baseboard management controller firmware to the gated flash memory.

In some embodiments, enabling the flash memory in which the backup baseboard management controller firmware is burned to start the backup baseboard management controller firmware from the flash memory in which the backup baseboard management controller firmware is burned includes:
- enabling the flash memory in which the backup baseboard management controller firmware is burned based on the serial peripheral interface controller to start the backup baseboard management controller firmware from the flash memory in which the backup baseboard management controller firmware is burned.

In some embodiments, the baseboard management controller includes a system on chip, and the following steps are performed based on the system on chip:
- in response to the server being powered on or reset, starting the baseboard management controller firmware from the one or more flash memories storing the baseboard management controller firmware;
- in response to the failure of starting the baseboard management controller firmware from the one or more flash memories storing the baseboard management controller firmware, starting the boot loader from the flash memory in which the boot loader is burned;

in response to the boot loader being successfully started, obtaining the backup baseboard management controller firmware from the external storage device through the boot loader, and burning the backup baseboard management controller firmware to any one of the one or more flash memories storing the baseboard management controller firmware; and in response to the burning being completed, resetting the server, and enabling the flash memory in which the backup baseboard management controller firmware is burned to start the backup baseboard management controller firmware from the flash memory in which the backup baseboard management controller firmware is burned.

Another aspect of the embodiments of the present disclosure further provides a fault recovery method for baseboard management controller firmware, including:

setting a plurality of flash memories in a server, burning a boot loader to one of the plurality of flash memories, and burning baseboard management controller firmware to other flash memories in the plurality of flash memories;

in response to the server being powered on or reset, starting the baseboard management controller firmware from the other flash memories storing the baseboard management controller firmware;

in response to a failure of starting the baseboard management controller firmware from the other flash memories storing the baseboard management controller firmware, starting the boot loader from the flash memory in which the boot loader is burned;

in response to the boot loader being successfully started, obtaining backup baseboard management controller firmware from an external storage device through the boot loader, and burning the backup baseboard management controller firmware to any one of the other flash memories storing the baseboard management controller firmware; and in response to the burning being completed, resetting the server, and enabling the flash memory in which the backup baseboard management controller firmware is burned to start the backup baseboard management controller firmware from the flash memory in which the backup baseboard management controller firmware is burned.

Another aspect of the embodiments of the present disclosure further provides a fault recovery system for baseboard management controller firmware, including:

a starting module configured to in response to a server being powered on or reset, start baseboard management controller firmware from one or more flash memories storing the baseboard management controller firmware. wherein the starting module is further configured to in response to a failure of starting the baseboard management controller firmware from the one or more flash memories storing the baseboard management controller firmware, start a boot loader from a flash memory in which the boot loader is burned;

a burning module configured to in response to the boot loader being successfully started, obtain backup baseboard management controller firmware from an external storage device through the boot loader, and burn the backup baseboard management controller firmware to any one of the one or more flash memories storing the baseboard management controller firmware; and a resetting module configured to in response to the burning being completed, reset the server, and enable the flash memory in which the backup baseboard management controller firmware is burned to start the backup baseboard management controller firmware from the flash memory in which the backup baseboard management controller firmware is burned.

Yet another aspect of the embodiments of the present disclosure further provides a computer device, including: at least one processor; and a memory storing a computer program that is executable in the processor, where the processor, when executing the computer program, performs the steps of the above method.

Still yet another aspect of the embodiments of the present disclosure further provides a computer non-transitory readable storage medium storing a computer program, where the computer program, when executed by a processor, causes the processor to perform the steps of the above method.

The present disclosure has at least the following beneficial technical effects: through the solution of the present disclosure, when the BMC firmware is abnormal, the BMC firmware may be automatically recovered without opening the server to disassemble the flash memories, and the operation is simple and convenient, thereby improving the maintenance efficiency and the product reliability of the server.

BRIEF DESCRIPTION OF THE DRAWINGS

In order to more clearly illustrate the technical solutions in the embodiments of the present disclosure or the related art, the following will briefly introduce accompanying drawings needed in the embodiments of the present disclosure or the related art. Obviously, the accompanying drawings in the following description are only some embodiments of the present disclosure, and a person skilled in the art can obtain other embodiments based on these accompanying drawings without paying creative work.

DETAILED DESCRIPTION

In order to make the objects, the technical solutions and the advantages of the present disclosure clearer, the embodiments of the present disclosure will be further described in detail by combining specific embodiments and referring the accompanying drawings.

It should be noted that all expressions of "first" and "second" in the embodiments of the present disclosure are intended to distinguish two different entities or different parameters that have the same names. It can be seen that "first" and "second" are only for the convenience of the expression, and should not be understood as a limitation on the embodiments of the present disclosure, which will not be explained in subsequent embodiments.

Figure 1:
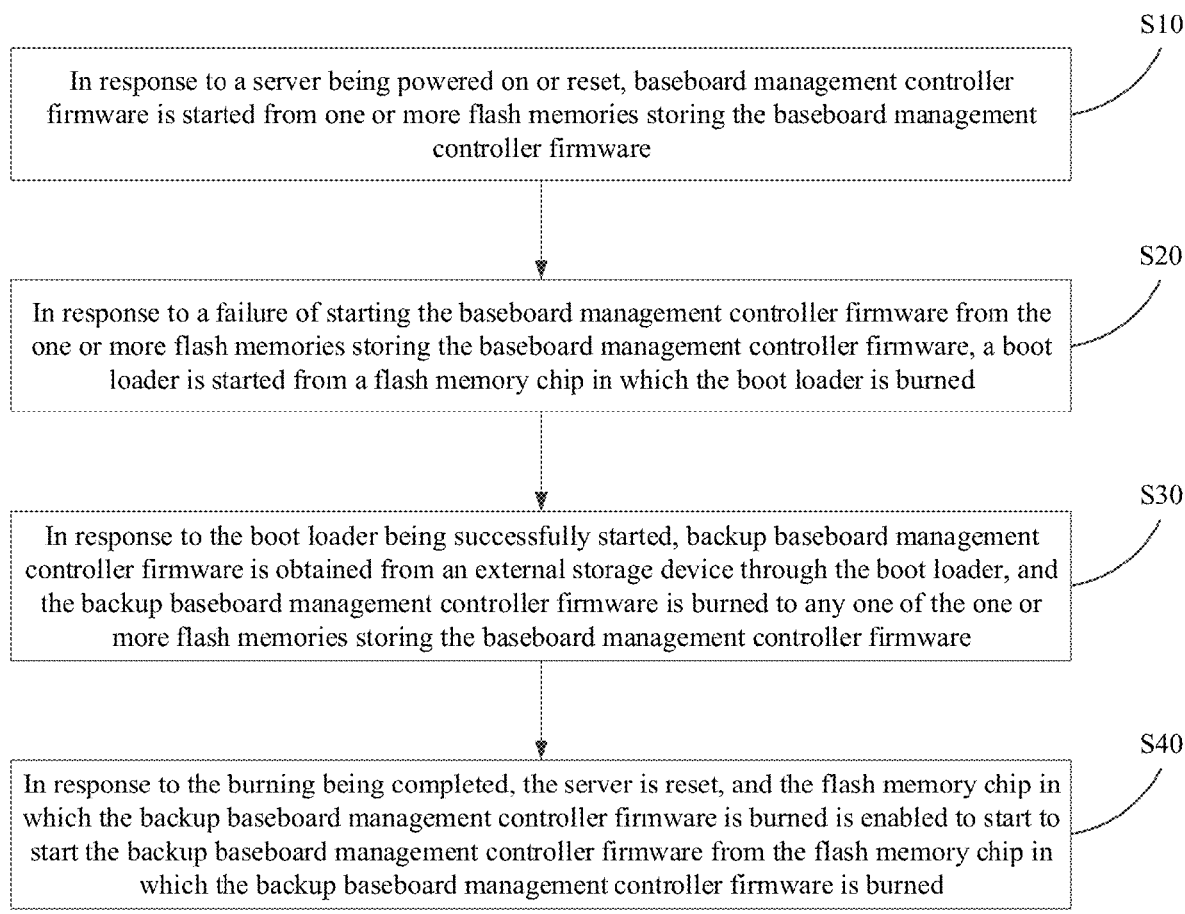
FIG. 1 is a flowchart of an embodiment of a fault recovery method for baseboard management controller firmware provided by the present disclosure.

Based on the above object, a first aspect of embodiments of the present disclosure provides an embodiment of a fault recovery method for baseboard management controller firmware. As shown in FIG. 1, following steps are performed based on a baseboard management controller:

S10, in response to a server being powered on or reset, baseboard management controller firmware is started from one or more flash memories storing the baseboard management controller firmware;

S20, in response to a failure of starting the baseboard management controller firmware from the one or more flash memories storing the baseboard management controller firmware, a boot loader is started from a flash memory in which the boot loader is burned;

S30, in response to the boot loader being successfully started, backup baseboard management controller firmware is obtained from an external storage device through the boot loader, and the backup baseboard management controller firmware is burned to any one of the one or more flash memories storing the baseboard management controller firmware; and S40, in response to the burning being completed, the server is reset, and the flash memory in which the backup baseboard management controller firmware is burned is enabled to start to start the backup baseboard management controller firmware from the flash memory in which the backup baseboard management controller firmware is burned.

In a specific embodiment, a plurality of flash memories (Flashes), for example. Flash0 to FlashN, are set on a server, and uboot firmware is burned to Flash0. When a server system is powered on or reset, it is attempted to start baseboard management controller (BMC) firmware from Flash1 to FlashN in turn. When both the BMC firmware in Flash1 and the BMC firmware in FlashN are abnormal, it will cause the startup to fail, and a system on chip (SOC) of a BMC will start the boot loader uboot from Flash0 at this time. After the starting of the uboot is completed, BMC firmware in an external storage device is burned to Flash1 through a trivial file transfer protocol (TFTP) service of an external communication service interface provided by the uboot. Then, the server system is reset, and normal BMC firmware is started from Flash1, thereby realizing the fault self-recovery of the BMC firmware.

Through the above solution, when the BMC firmware is abnormal, the BMC firmware may be automatically recovered without opening the server to disassemble the flash memories, and the operation is simple and convenient, thereby improving the maintenance efficiency and the product reliability of the server.

In some embodiments, starting the baseboard management controller firmware from the one or more flash memories storing the baseboard management controller firmware includes:

starting a hardware timer, and starting the baseboard management controller firmware from the one or more flash memories storing the baseboard management controller firmware.

In some embodiments, in response to the failure of starting the baseboard management controller firmware from the one or more flash memories storing the baseboard management controller firmware includes:

in a process of starting the baseboard management controller firmware, in response to a timing of the hardware timer exceeding a threshold, determining that starting the baseboard management controller firmware from the one or more flash memories storing the baseboard management controller firmware failed.

In some embodiments, in response to the boot loader being successfully started, obtaining the backup baseboard management controller firmware from the external storage device through the boot loader includes:

in response to the boot loader being successfully started, turning off the hardware timer, and obtaining the backup baseboard management controller firmware from the external storage device through the boot loader.

In some embodiments, starting the baseboard management controller firmware from the one or more flash memories storing the baseboard management controller firmware includes:

selecting a flash memory from all flash memories storing the baseboard management controller firmware in a set order to start the baseboard management controller firmware; and in response to a failure of starting the baseboard management controller firmware from the selected flash memory, returning to the step of selecting the flash memory from all flash memories storing the baseboard management controller firmware in the set order to select a next flash memory from all flash memories storing the baseboard management controller firmware to start the baseboard management controller firmware.

In some embodiments, the method further includes:

in response to a success of starting the baseboard management controller firmware from the selected flash memory, waiting for a completion of starting the baseboard management controller.

In some embodiments, starting the baseboard management controller firmware from the one or more flash memories storing the baseboard management controller firmware includes:

starting a hardware timer, and selecting a flash memory from all flash memories storing the baseboard management controller firmware in a set order to start the baseboard management controller firmware;

in a process of starting the baseboard management controller firmware, in response to a timing of the hardware timer exceeding a threshold, determining that starting the baseboard management controller firmware from the selected flash memory failed; and resetting the hardware timer, and returning to the step of starting the hardware timer, and selecting the flash memory from all flash memories storing the baseboard management controller firmware in the set order to start the baseboard management controller firmware.

In some embodiments, the method further includes:

in response to a success of starting the baseboard management controller firmware from the selected flash memory, turning off the hardware timer to wait for a completion of starting the baseboard management controller.

Figure 2:
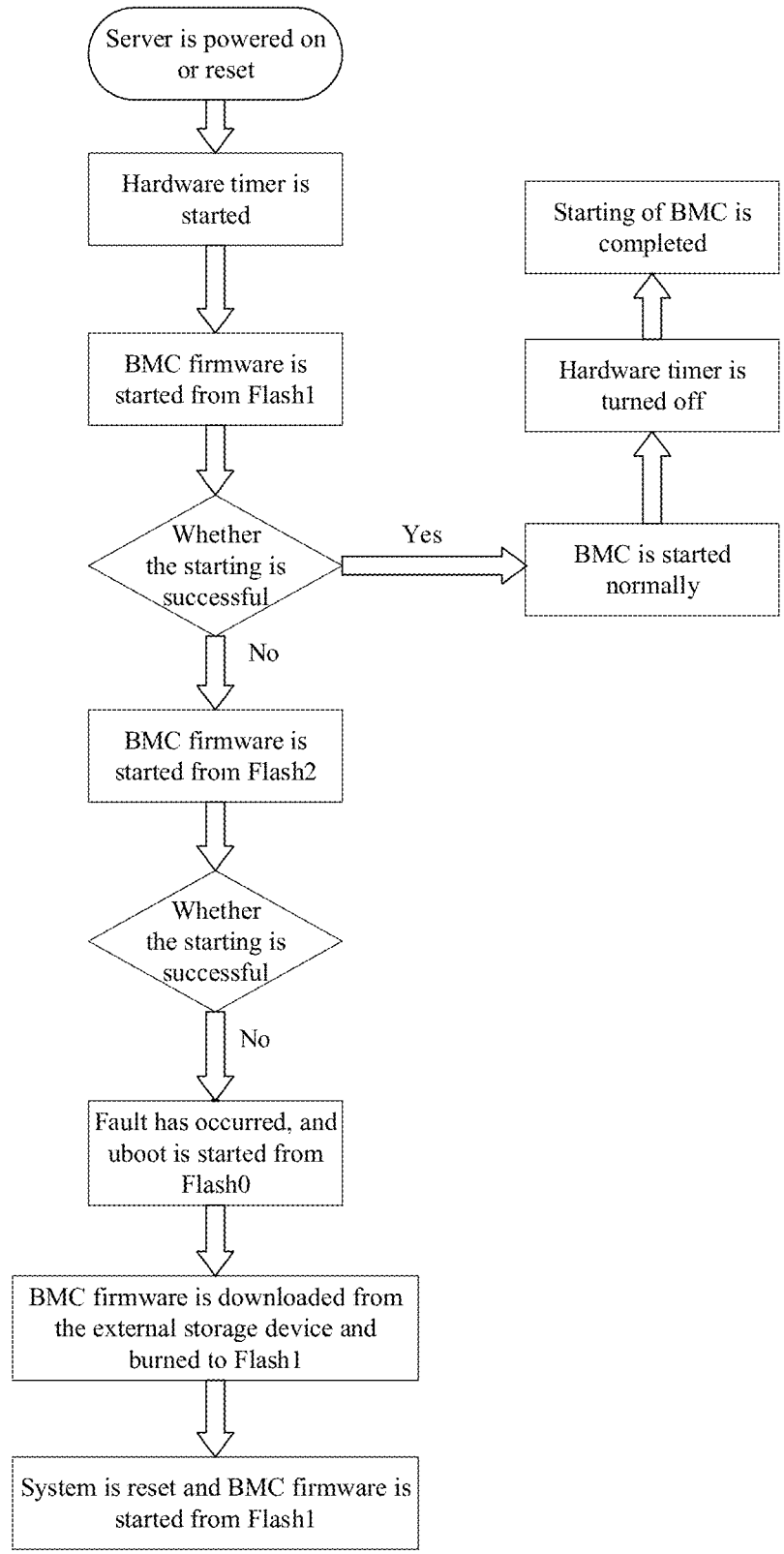
FIG. 2 is a flowchart of an embodiment of a fault recovery method for baseboard management controller firmware provided by the present disclosure.

In a specific embodiment, as shown in FIG. 2, FIG. 2 is a flowchart of a fault recovery method for baseboard management controller firmware.

After receiving a power on or reset signal, the SOC of the BMC will first perform hardware initialization and start a hardware timer. Assuming that the server has three Flashes, namely Flash0, Flash1 and Flash2, Flash0 stores the boot loader. Flash1 and Flash2 store the BMC firmware, and a startup sequence is preset. The BMC firmware is started from a corresponding Flash according to the preset startup sequence. First, it is attempted to start the BMC firmware from Flash1. If there is no abnormality in the BMC firmware, the hardware timer previously turned on is turned off during the process of starting the BMC firmware, and then wait for the system to perform software-related initialization to start the whole system normally. If the hardware timer times out, the SOC of the BMC will first reset the hardware timer to restart timing, and then attempt to start the BMC firmware from Flash2; if the starting is successful, the subsequent process is the same as that from Flash1. If the hardware timer times out again, it means that starting the firmware from Flash2 has also failed, that is, a fault has occurred at this time, and both the firmware in Flash1 and the firmware in Flash2 have been abnormal. The boot loader uboot is started from Flash0, after the starting of the uboot is completed, the BMC firmware in the external storage device is burned to Flash1 through the TFTP service of the external communication service interface provided by the uboot, then the server system is reset, and the normal BMC firmware is started from Flash1, thereby realizing the fault self-recovery of the BMC firmware.

Through the above solution, when the BMC firmware is abnormal, the BMC firmware may be automatically recovered without opening the server to disassemble the flash memories, and the operation is simple and convenient, thereby improving the maintenance efficiency and the product reliability of the server.

In some embodiments, before in response to the server being powered on or reset, starting the baseboard management controller firmware from the one or more flash memories storing the baseboard management controller firmware, the method further includes: connecting a decoder, the flash memory in which the boot loader is burned and the one or more flash memories storing the baseboard management controller firmware through a serial peripheral interface controller, and connecting the flash memory in which the boot loader is burned and the one or more flash memories storing the baseboard management controller firmware through the decoder to gate a corresponding flash memory when the server is powered on or reset.

In some embodiments, connecting the decoder, the flash memory in which the boot loader is burned and the one or more flash memories storing the baseboard management controller firmware through the serial peripheral interface controller includes: connecting signal transmission pins of the flash memory in which the boot loader is burned and signal transmission pins of the one or more flash memories storing the baseboard management controller firmware through signal transmission pins of the serial peripheral interface controller, and connecting input pins of the decoder through a chip select pin of the serial peripheral interface controller.

In some embodiments, connecting the flash memory in which the boot loader is burned and the one or more flash memories storing the baseboard management controller firmware through the decoder includes: connecting enable pins of the flash memory in which the boot loader is burned and enable pins of the one or more flash memories storing the baseboard management controller firmware through output pins of the decoder.

Figure 3:
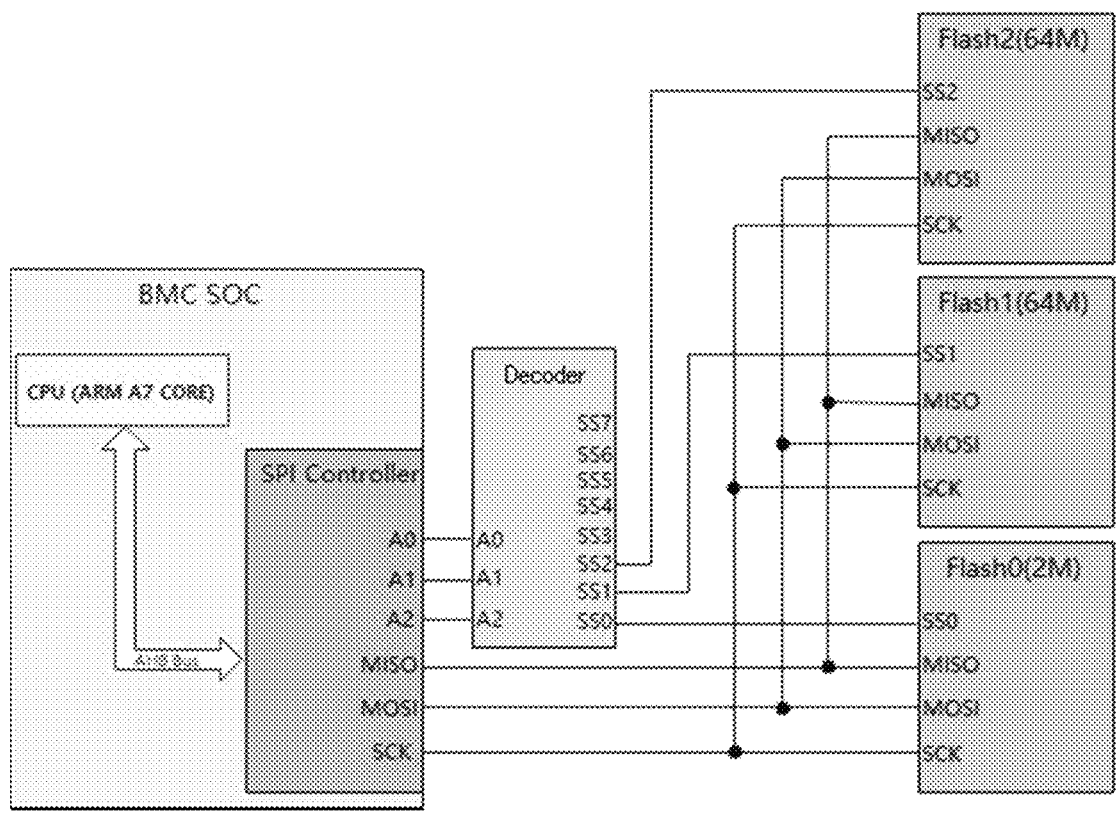
FIG. 3 is a schematic diagram of a hardware structure of an embodiment of a fault recovery system for baseboard management controller firmware provided by the present disclosure.

In a specific embodiment, as shown in FIG. 3, FIG. 3 is a schematic diagram of a hardware structure of a fault recovery system for baseboard management controller firmware.

A master in slave out (MISO), a master out slave in (MOSI), a serial clock (SCK) and a slave select (SS, also known as a chip select) are serial peripheral interface (SPI) bus protocol signal lines. In the FIG. 3, the MISO is a master input and slave output pin. The MOSI is a master output and slave input pin. The SCK is a serial clock pin, which is used as an output of a master device and an input of a slave device. A0 to A2, that is, the SS, are slave select pins, which are used to the select slave device. A0 to A2 pins are used as chip select pins to enable the master device to communicate with designated slave devices independently, thereby avoiding conflicts on data lines.

In a subsystem SPI controller in the SOC of the BMC, pins A0, A1 and A2 are connected to corresponding input pins of the decoder, which are mainly used for pin expansion. In the decoder, an output pin SS0 is connected to Flash0, an output pin SS1 is connected to Flash1 and an output pin SS2 is connected to Flash2, up to eight pieces of Flashes.

The hardware timer and the decoder control the SS chip select pins to gate the Flash that needs to be started. When starting each time, it is attempted to start from Flash1, if it is normal, the starting is successful; and if it is abnormal, it is attempted to start a next Flash. If both the BMC firmware in Flash1 and the BMC firmware in Flash2 (attempt to start to FlashN in a multi-Flash scenario) are abnormal, the uboot firmware in Flash0) will be started, and the fault recovery of the BMC firmware is performed on Flash1 through the TFTP service provided by the uboot and a read-write operation service of the Flash.

In some embodiments, starting the baseboard management controller firmware from the one or more flash memories storing the baseboard management controller firmware includes:
   starting a hardware timer, and selecting a flash memory from all flash memories storing the baseboard management controller firmware in a set order based on the serial peripheral interface controller to start the baseboard management controller firmware;
   in a process of starting the baseboard management controller firmware, in response to a timing of the hardware timer exceeding a threshold, determining that starting the baseboard management controller firmware from the selected flash memory failed;
   resetting the hardware timer, and returning to the step of starting the hardware timer, and selecting the flash memory from all flash memories storing the baseboard management controller firmware in the set order based on the serial peripheral interface controller to start the baseboard management controller firmware to select the flash memory from all flash memories storing the baseboard management controller firmware based on the serial peripheral interface controller to start the baseboard management controller firmware; and
   in response to a success of starting the baseboard management controller firmware from the selected flash memory, turning off the hardware timer to wait for a completion of starting the baseboard management controller.

In some embodiments, in response to the failure of starting the baseboard management controller firmware from the one or more flash memories storing the baseboard management controller firmware, starting the boot loader from the flash memory in which the boot loader is burned includes:

in response to the failure of starting the baseboard management controller firmware from the one or more flash memories storing the baseboard management controller firmware, gating the flash memory in which the boot loader is burned based on the serial peripheral interface controller to start the boot loader from the flash memory in which the boot loader is burned.

In some embodiments, burning the backup baseboard management controller firmware to any one of the one or more flash memories storing the baseboard management controller firmware includes:

gating any flash memory storing the baseboard management controller firmware from all flash memories storing the baseboard management controller firmware based on the serial peripheral interface controller to burn the backup baseboard management controller firmware to the gated flash memory.

In some embodiments, enabling the flash memory in which the backup baseboard management controller firmware is burned to start the backup baseboard management controller firmware from the flash memory in which the backup baseboard management controller firmware is burned includes:

enabling the flash memory in which the backup baseboard management controller firmware is burned based on the serial peripheral interface controller to start the backup baseboard management controller firmware from the flash memory in which the backup baseboard management controller firmware is burned.

In some embodiments, the baseboard management controller includes a system on chip, and the following steps are performed based on the system on chip:

in response to the server being powered on or reset, starting the baseboard management controller firmware from the one or more flash memories storing the baseboard management controller firmware;

in response to the failure of starting the baseboard management controller firmware from the one or more flash memories storing the baseboard management controller firmware, starting the boot loader from the flash memory in which the boot loader is burned;

in response to the boot loader being successfully started, obtaining the backup baseboard management controller firmware from the external storage device through the boot loader, and burning the backup baseboard management controller firmware to any one of the one or more flash memories storing the baseboard management controller firmware; and in response to the burning being completed, resetting the server, and enabling the flash memory in which the backup baseboard management controller firmware is burned to start the backup baseboard management controller firmware from the flash memory in which the backup baseboard management controller firmware is burned.

Figure 4:
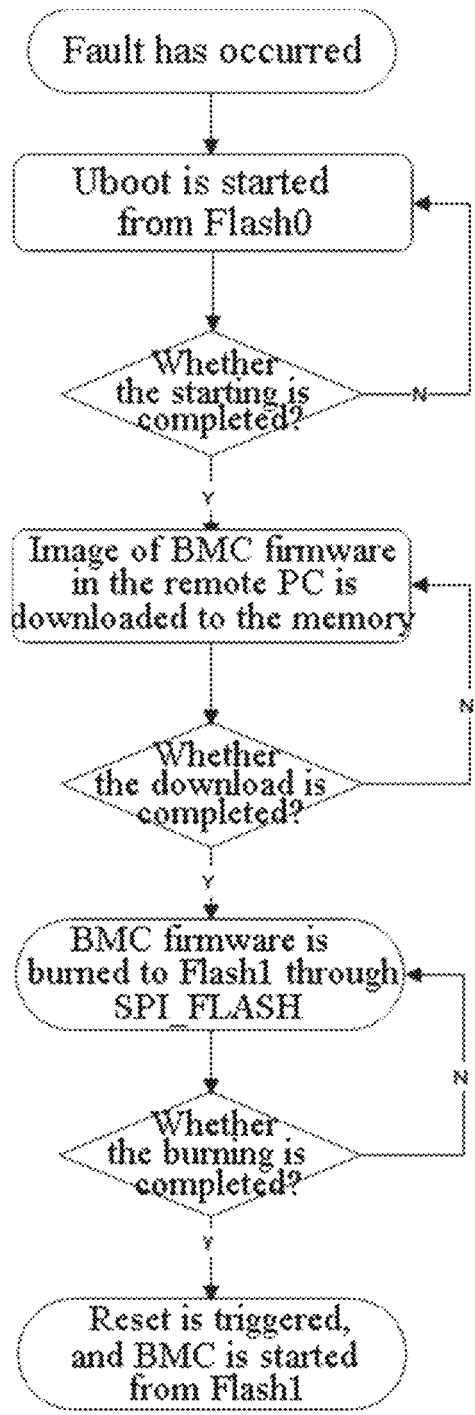
FIG. 4 is a flowchart of an embodiment of a recovery method after baseboard management controller firmware failed provided by the present disclosure.

In a specific embodiment, as shown in FIG. 4, FIG. 4 is a flowchart of a recovery method after baseboard management controller firmware failed provided by the present disclosure.

When the BMC firmware fails to start from the Flash storing the BMC firmware fails, assuming that the Flash storing the BMC firmware in the server includes Flash1 and Flash2, after the Flash1 and Flash2 fail to start, it means that the fault has occurred, and then the fault recovery mechanism will be started immediately. The fault recovery process is as follows.

The SOC of the BMC will control the decoder to switch a SPI chip select signal through pins A0, A1 and A2 by using the SPI controller, and gate the SS0, that is, start the uboot firmware stored in Flash0. After the uboot is successfully started, the hardware timer is turned off to stop working. After the normal starting of the uboot is completed, preconfigured BMC firmware in a remote environment is uploaded to a memory of a target BMC through the TFTP service of the external communication service interface provided by the uboot. After the uploading is completed, a Flash operation interface provided by SPI_Flash parameter is called to perform a Flash write operation, and the normal BMC firmware is burned to Flash1. After the burning is completed, a reset command is executed. Subsequently, the SOC of the BMC will switch the SPI chip select signal, enable the SS1 and then start the BMC normally from Flash1. At this point, the fault self-recovery of the BMC firmware is completed.

Through the above solution, when the BMC firmware is abnormal, the BMC firmware may be automatically recovered without opening the server to disassemble the flash memories, and the operation is simple and convenient, thereby improving the maintenance efficiency and the product reliability of the server.

Figure 5:
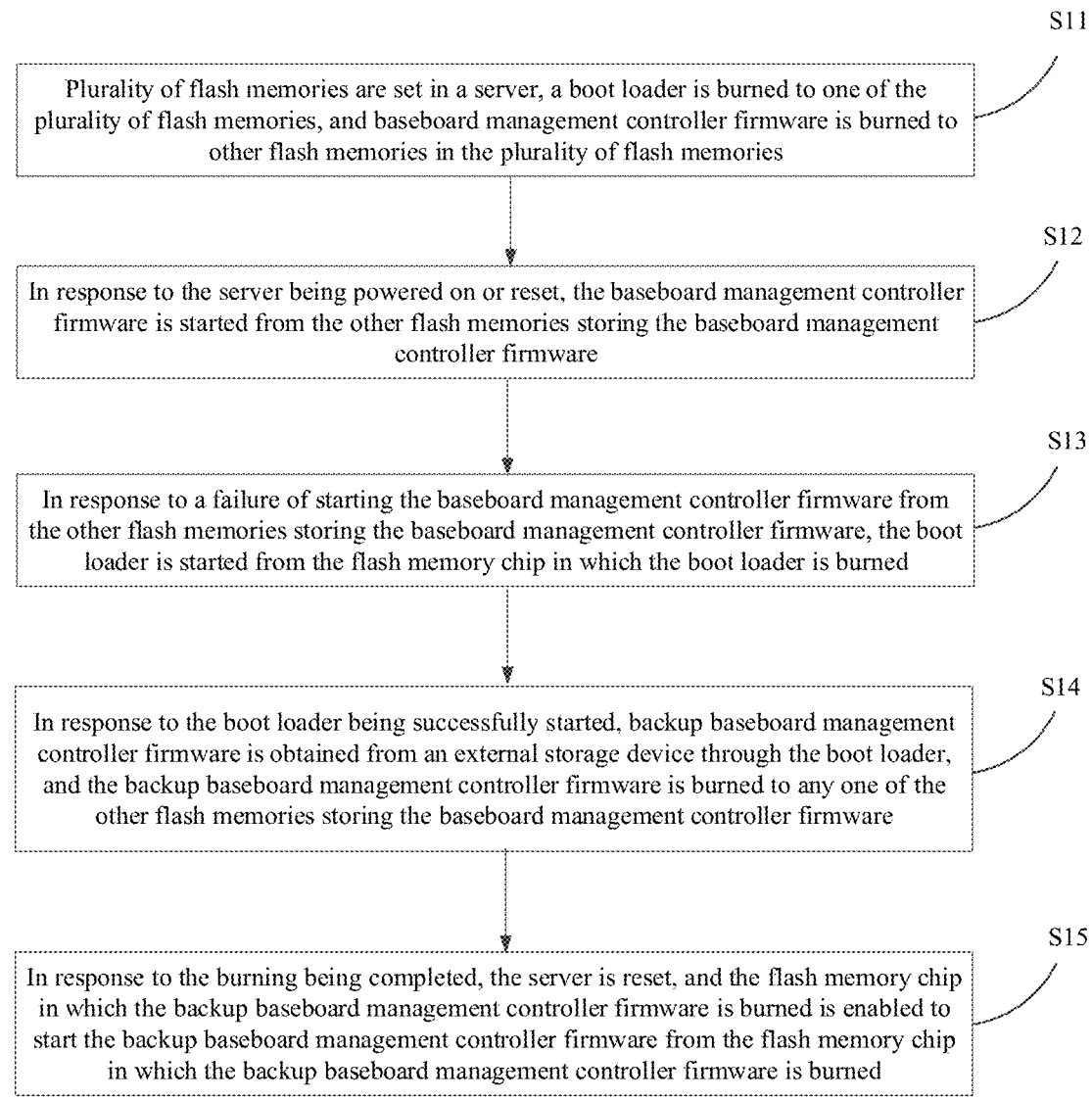
FIG. 5 is a flowchart of an embodiment of a fault recovery method for baseboard management controller firmware provided by the present disclosure.

Based on the same inventive concept, according to another aspect of the present disclosure, as shown in FIG. 5, an embodiment of the present disclosure further provides a fault recovery method for baseboard management controller firmware, including:

S11, a plurality of flash memories are set in a server, a boot loader is burned to one of the plurality of flash memories, and baseboard management controller firmware is burned to other flash memories in the plurality of flash memories;

S12, in response to the server being powered on or reset, the baseboard management controller firmware is started from the other flash memories storing the baseboard management controller firmware;

S13, in response to a failure of starting the baseboard management controller firmware from the other flash memories storing the baseboard management controller firmware, the boot loader is started from the flash memory in which the boot loader is burned;

S14, in response to the boot loader being successfully started, backup baseboard management controller firmware is obtained from an external storage device through the boot loader, and the backup baseboard management controller firmware is burned to any one of the other flash memories storing the baseboard management controller firmware; and S15, in response to the burning being completed, the server is reset, and the flash memory in which the backup baseboard management controller firmware is burned is enabled to start the backup baseboard management controller firmware from the flash memory in which the backup baseboard management controller firmware is burned.

In a specific embodiment, a plurality of flash memories (Flashes), for example, Flash0 to FlashN, are set on a server, uboot firmware is burned to Flash0, and baseboard management controller (BMC) firmware is burned to Flash1 to FlashN, where Flash0 uses a high reliability storage unit. After the uboot firmware is burned to Flash0, write protection is turned on to ensure that firmware contents will not be modified when the server runs, thereby avoiding abnormal situations of the uboot firmware. When a server system is powered on or reset, it is attempted to start the BMC firmware from Flash1 to FlashN in turn. When both the BMC firmware in Flash1 and the BMC firmware in FlashN are abnormal, it will cause the startup to fail, and a system on chip (SOC) of a BMC will start the boot loader uboot from Flash0 at this time. After the starting of the uboot is completed. BMC firmware in an external storage device is burned to Flash1 through a trivial file transfer protocol (TFTP) service of an external communication service interface provided by the uboot. Then, the server system is reset, and normal BMC firmware is started from Flash1, thereby realizing the fault self-recovery of the BMC firmware.

Through the above solution, the problem that a version of the BMC firmware may only be recovered by disassembling the flash memories storing the BMC firmware and using a burner is solved, thereby avoiding complex operations such as server disassembly and repeated bonding, and improving the reliability of server products. In addition, the solutions of using the plurality of Flashes to store the BMC firmware and using the high reliability storage Flash to burn the uboot ensure that the server products may perform the fault self-recovery of the BMC firmware under most abnormal situations, thereby improving the reliability of the server products.

Figure 6:
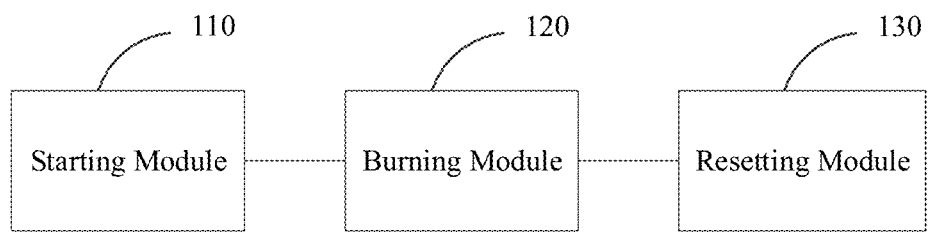
FIG. 6 is a schematic diagram of an embodiment of a fault recovery system for baseboard management controller firmware provided by the present disclosure.

Based on the same inventive concept, according to another aspect of the present disclosure, as shown in FIG. 6, an embodiment of the present disclosure further provides a fault recovery system for baseboard management controller firmware, including:
- a starting module 110 configured to in response to a server being powered on or reset, start baseboard management controller firmware from one or more flash memories storing the baseboard management controller firmware.
- wherein the starting module 110 is further configured to in response to a failure of starting the baseboard management controller firmware from the one or more flash memories storing the baseboard management controller firmware, start a boot loader from a flash memory in which the boot loader is burned;
- a burning module 120 configured to in response to the boot loader being successfully started, obtain backup baseboard management controller firmware from an external storage device through the boot loader, and burn the backup baseboard management controller firmware to any one of the one or more flash memories storing the baseboard management controller firmware; and
- a resetting module 130 configured to in response to the burning being completed, reset the server, and enable the flash memory in which the backup baseboard management controller firmware is burned to start the backup baseboard management controller firmware from the flash memory in which the backup baseboard management controller firmware is burned.

Figure 7:
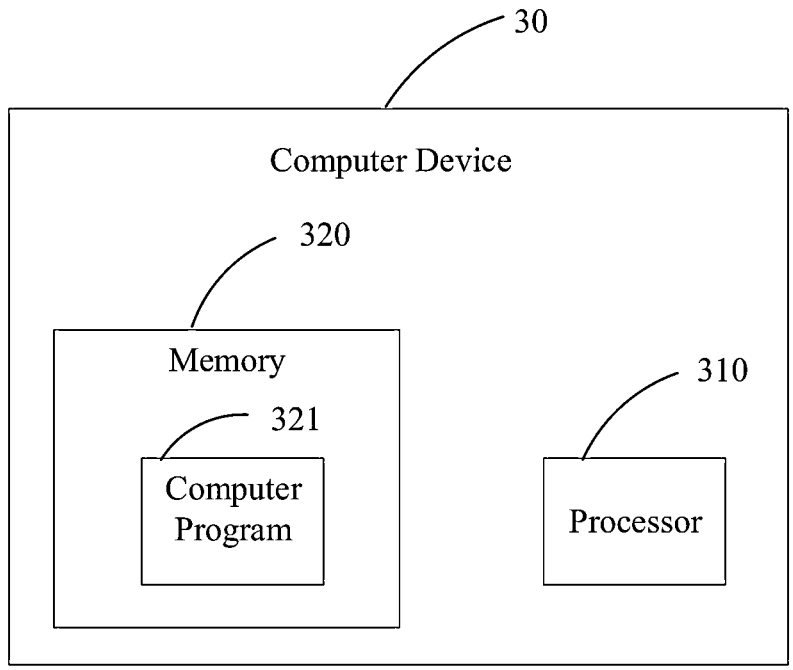
FIG. 7 is a schematic structural diagram of an embodiment of a computer device provided by the present disclosure.

Based on the same inventive concept, according to another aspect of the present disclosure, as shown in FIG. 7, an embodiment of the present disclosure further provides a computer device 30. The computer device 30 includes a processor 310 and a memory 320. The memory 320 stores a computer program 321 that is executable on the processor, and when executing the program, the processor 310 executes the steps of the above method.

As a non-transitory computer readable storage medium, the memory can be used to store non-transitory software programs, non-transitory computer executable programs and modules, for example, program instructions/modules corresponding to the fault recovery method for the baseboard management controller firmware in the embodiments of the present disclosure. The processor executes various functional applications of a system and data processing by running the non-transitory software programs, instructions and modules stored in the memory, that is, implement the fault recovery method for the baseboard management controller firmware in the method embodiments described above.

The memory can include a program storage area and a data storage area. The program storage area can store an operating system and application programs required by at least one function. The data storage region can store data created based on the use of the system, and the like. In addition, the memory can include a high-speed random access memory, or can further include a non-transitory memory, for example, at least one disk storage device, a flash memory device, or other non-transitory solid state storage devices. In some embodiments, the memory includes memories that are remotely arranged relative to the processor, and these remote memories can be connected to local modules via a network. Examples of the network include, but are not limited to, the Internet, corporate intranets, local area networks, mobile communication networks and combinations thereof.

Figure 8:
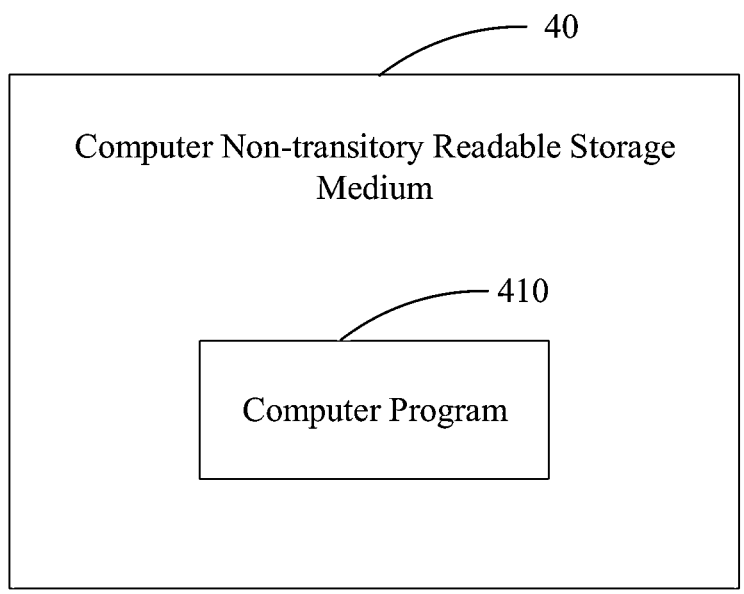
FIG. 8 is a schematic structural diagram of an embodiment of a computer non-transitory readable storage medium provided by the present disclosure.

Based on the same inventive concept, according to another aspect of the present disclosure, as shown in FIG. 8, an embodiment of the present disclosure further provides a computer non-transitory readable storage medium 40. The computer non-transitory readable storage medium 40 stores a computer program 410 that executes the above method when executed by a processor.

Finally, it should be noted that a person skilled in the art can understand that all or a part of the processes of the methods in the above embodiments can be completed by instructing related hardware through a computer program. The program can be stored in a computer non-transitory readable storage medium, and when the program is executed, the processes in the above various method embodiments can be included. The non-transitory readable storage medium for storing the program can be a magnetic disk, an optical disk, a read-only memory (ROM), a random access memory (RAM), or the like. Embodiments of the computer program can achieve the same or similar effects as any method embodiment corresponding thereto.

A person skilled in the art will further understand that various exemplary logical blocks, modules, circuits and algorithm steps described in connection with the disclosure herein can be implemented as electronic hardware, computer software, or a combination of both. In order to clearly illustrate the interchangeability of hardware and software, a general description of functions of various illustrative components, blocks, modules, circuits and steps has been generally described. Whether such functions are implemented as software or hardware depends on particular applications and design constraints imposed on the whole system. A person skilled in the art can implement the functions in various ways for each specific application, but such implementation decisions should not be interpreted as causing a departure from the scope disclosed in the embodiments of the present disclosure.

The above are exemplary embodiments disclosed in the present disclosure, but it should be noted that various changes and modifications can be made without departing from the scope disclosed in the embodiments of the present disclosure as defined by the claims. The functions, steps and/or actions of the method claims according to the disclosed embodiments described herein need not be performed in any particular order. Serial numbers of the embodiments disclosed in the embodiments of the present disclosure are only for description, and do not represent the advantages and disadvantages of the embodiments. In addition, although elements disclosed in the embodiments of the present disclosure can be described or claimed in an individual form, it is also understood that there may be multiple elements unless explicitly limited to the singular.

It should be understood that as used herein, the singular form "a (an)" is intended to include plural forms as well, unless the context clearly supports exceptions. It should also be understood that "and/or" as used herein refers to any and all possible combinations including one or more associated listed items.

It should be understood by a person skill in the art that the discussion of any of the above embodiments is only exemplary, and is not intended to imply that the scope (including the claims) disclosed in embodiments of the present disclosure is limited to these examples. Under the idea of the embodiments of the present disclosure, technical features in the above embodiments or different embodiments can also be combined, and there are many other variations in different aspects of the embodiments of the present disclosure, which are not provided in the details for the sake of conciseness. Therefore, any omission, modification, equivalent substitution, improvement, and the like made within the spirit and principle of embodiments of the present disclosure should be included in the protection scope of the embodiments of the present disclosure.

The invention claimed is:

1. A fault recovery method for baseboard management controller firmware, comprising:
   connecting a decoder, a flash memory in which a boot loader is burned and the one or more flash memories storing the baseboard management controller firmware through a serial peripheral interface controller, and connecting the flash memory in which the boot loader is burned and the one or more flash memories storing the baseboard management controller firmware through the decoder to gate a corresponding flash memory when the server is powered on or reset; and
   in response to a server being powered on or reset, performing, by a system on chip of a baseboard management controller, following steps:
      starting baseboard management controller firmware from one or more flash memories storing the baseboard management controller firmware;
      in response to a failure of starting the baseboard management controller firmware from the one or more flash memories storing the baseboard management controller firmware, gating the flash memory in which the boot loader is burned based on the serial peripheral interface controller to start the boot loader from the flash memory in which the boot loader is burned;
      in response to the boot loader being successfully started, obtaining backup baseboard management controller firmware from an external storage device through the boot loader, and burning the backup baseboard management controller firmware to any one of the one or more flash memories storing the baseboard management controller firmware; and
      in response to the burning being completed, resetting the server, and enabling the flash memory in which the backup baseboard management controller firmware is burned to start the backup baseboard management controller firmware from the flash memory in which the backup baseboard management controller firmware is burned.

2. The method according to claim 1, wherein starting the baseboard management controller firmware from the one or more flash memories storing the baseboard management controller firmware comprises:
   starting a hardware timer, and starting the baseboard management controller firmware from the one or more flash memories storing the baseboard management controller firmware.

3. The method according to claim 2, wherein in response to the failure of starting the baseboard management controller firmware from the one or more flash memories storing the baseboard management controller firmware comprises:
   in a process of starting the baseboard management controller firmware, in response to a timing of the hardware timer exceeding a threshold, determining that starting the baseboard management controller firmware from the one or more flash memories storing the baseboard management controller firmware failed.

4. The method according to claim 2, wherein in response to the boot loader being successfully started, obtaining the backup baseboard management controller firmware from the external storage device through the boot loader comprises:
   in response to the boot loader being successfully started, turning off the hardware timer, and obtaining the backup baseboard management controller firmware from the external storage device through the boot loader.

5. The method according to claim 1, wherein starting the baseboard management controller firmware from the one or more flash memories storing the baseboard management controller firmware comprises:
   selecting a flash memory from all flash memories storing the baseboard management controller firmware in a set order to start the baseboard management controller firmware; and
   in response to a failure of starting the baseboard management controller firmware from the selected flash memory, returning to the step of selecting the flash memory from all flash memories storing the baseboard management controller firmware in the set order to select a next flash memory from all flash memories storing the baseboard management controller firmware to start the baseboard management controller firmware.

6. The method according to claim 5, further comprising:
   in response to a success of starting the baseboard management controller firmware from the selected flash memory, waiting for a completion of starting the baseboard management controller.

7. The method according to claim 1, wherein starting the baseboard management controller firmware from the one or more flash memories storing the baseboard management controller firmware comprises:
- starting a hardware timer, and selecting a flash memory from all flash memories storing the baseboard management controller firmware in a set order to start the baseboard management controller firmware;
- in a process of starting the baseboard management controller firmware, in response to a timing of the hardware timer exceeding a threshold, determining that starting the baseboard management controller firmware from the selected flash memory failed; and
- resetting the hardware timer, and returning to the step of starting the hardware timer, and selecting the flash memory from all flash memories storing the baseboard management controller firmware in the set order to start the baseboard management controller firmware.

8. The method according to claim 7, further comprising:
in response to a success of starting the baseboard management controller firmware from the selected flash memory, turning off the hardware timer to wait for a completion of starting the baseboard management controller.

9. The method according to claim 1, wherein connecting the decoder, the flash memory in which the boot loader is burned and the one or more flash memories storing the baseboard management controller firmware through the serial peripheral interface controller comprises:
connecting signal transmission pins of the flash memory in which the boot loader is burned and signal transmission pins of the one or more flash memories storing the baseboard management controller firmware through signal transmission pins of the serial peripheral interface controller, and connecting input pins of the decoder through a chip select pin of the serial peripheral interface controller.

10. The method according to claim 9, wherein connecting the flash memory in which the boot loader is burned and the one or more flash memories storing the baseboard management controller firmware through the decoder comprises:
connecting enable pins of the flash memory in which the boot loader is burned and enable pins of the one or more flash memories storing the baseboard management controller firmware through output pins of the decoder.

11. The method according to claim 1, wherein starting the baseboard management controller firmware from the one or more flash memories storing the baseboard management controller firmware comprises:
- starting a hardware timer, and selecting a flash memory from all flash memories storing the baseboard management controller firmware in a set order based on the serial peripheral interface controller to start the baseboard management controller firmware;
- in a process of starting the baseboard management controller firmware, in response to a timing of the hardware timer exceeding a threshold, determining that starting the baseboard management controller firmware from the selected flash memory failed;
- resetting the hardware timer, and returning to the step of starting the hardware timer, and selecting the flash memory from all flash memories storing the baseboard management controller firmware in the set order based on the serial peripheral interface controller to start the baseboard management controller firmware to select the flash memory from all flash memories storing the baseboard management controller firmware based on the serial peripheral interface controller to start the baseboard management controller firmware; and
- in response to a success of starting the baseboard management controller firmware from the selected flash memory, turning off the hardware timer to wait for a completion of starting the baseboard management controller.

12. The method according to claim 1, wherein burning the backup baseboard management controller firmware to any one of the one or more flash memories storing the baseboard management controller firmware comprises:
gating any flash memory storing the baseboard management controller firmware from all flash memories storing the baseboard management controller firmware based on the serial peripheral interface controller to burn the backup baseboard management controller firmware to the gated flash memory.

13. The method according to claim 1, wherein enabling the flash memory in which the backup baseboard management controller firmware is burned to start the backup baseboard management controller firmware from the flash memory in which the backup baseboard management controller firmware is burned comprises:
enabling the flash memory in which the backup baseboard management controller firmware is burned based on the serial peripheral interface controller to start the backup baseboard management controller firmware from the flash memory in which the backup baseboard management controller firmware is burned.

14. A computer non-transitory readable storage medium storing a computer program, wherein the computer program, when executed by a processor, causes the processor to perform the steps of the method according to claim 1.

15. A fault recovery method for baseboard management controller firmware, comprising:
- setting a plurality of flash memories in a server, burning a boot loader to one of the plurality of flash memories, and burning baseboard management controller firmware to other flash memories in the plurality of flash memories;
- connecting a decoder, a flash memory in which a boot loader is burned and the one or more flash memories storing the baseboard management controller firmware through a serial peripheral interface controller, and connecting the flash memory in which the boot loader is burned and the one or more flash memories storing the baseboard management controller firmware through the decoder to gate a corresponding flash memory when the server is powered on or reset; and
- in response to a server being powered on or reset, performing, by a system on chip of a baseboard management controller, following steps:
  - starting baseboard management controller firmware from one or more flash memories storing the baseboard management controller firmware;
  - in response to a failure of starting the baseboard management controller firmware from the one or more flash memories storing the baseboard management controller firmware, gating the flash memory in which the boot loader is burned based on the serial peripheral interface controller to start the boot loader from the flash memory in which the boot loader is burned;
  - in response to the boot loader being successfully started, obtaining backup baseboard management controller firmware from an external storage device through the boot loader, and burning the backup baseboard management controller firmware to any one of the other flash memories storing the baseboard management controller firmware; and in response to the burning being completed, resetting the server, and enabling the flash memory in which the backup baseboard management controller firmware is burned to start the backup baseboard management controller firmware from the flash memory in which the backup baseboard management controller firmware is burned.

16. The method according to claim 15, wherein after burning the boot loader to one of the plurality of flash memories, the method further comprises:

turning on write protection to ensure that contents of the flash memory will not be modified when the server runs.

17. A computer device, comprising:

at least one processor; and a memory storing a computer program that is executable in the processor, wherein the processor, when executing the computer program, performs the operations comprising:

connecting a decoder, a flash memory in which a boot loader is burned and the one or more flash memories storing the baseboard management controller firmware through a serial peripheral interface controller, and connecting the flash memory in which the boot loader is burned and the one or more flash memories storing the baseboard management controller firmware through the decoder to gate a corresponding flash memory when the server is powered on or reset; and in response to a server being powered on or reset, performing, by a system on chip of a baseboard management controller, following steps:

starting baseboard management controller firmware from one or more flash memories storing the baseboard management controller firmware;

in response to a failure of starting the baseboard management controller firmware from the one or more flash memories storing the baseboard management controller firmware, gating the flash memory in which the boot loader is burned based on the serial peripheral interface controller to start the boot loader from the flash memory in which the boot loader is burned;

in response to the boot loader being successfully started, obtaining backup baseboard management controller firmware from an external storage device through the boot loader, and burning the backup baseboard management controller firmware to any one of the one or more flash memories storing the baseboard management controller firmware; and in response to the burning being completed, resetting the server, and enabling the flash memory in which the backup baseboard management controller firmware is burned to start the backup baseboard management controller firmware from the flash memory in which the backup baseboard management controller firmware is burned.

18. The method according to claim 17, wherein starting the baseboard management controller firmware from the one or more flash memories storing the baseboard management controller firmware comprises:

starting a hardware timer, and starting the baseboard management controller firmware from the one or more flash memories storing the baseboard management controller firmware.

* * * * *